(12) United States Patent
Li et al.

(10) Patent No.: US 12,252,148 B2
(45) Date of Patent: Mar. 18, 2025

(54) LANE DEPARTURE WARNING METHOD AND LANE DEPARTURE WARNING SYSTEM

(71) Applicant: NIO TECHNOLOGY (ANHUI) CO., LTD, Hefei (CN)

(72) Inventors: Junhua Li, Shanghai (CN); Daoyan Guo, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 356 days.

(21) Appl. No.: 17/835,737

(22) Filed: Jun. 8, 2022

(65) Prior Publication Data

US 2022/0396286 A1 Dec. 15, 2022

(30) Foreign Application Priority Data

Jun. 9, 2021 (CN) .......................... 202110641729.7

(51) Int. Cl.
*B60W 50/14* (2020.01)
*B60W 30/12* (2020.01)
*B60W 40/10* (2012.01)

(52) U.S. Cl.
CPC ............ *B60W 50/14* (2013.01); *B60W 30/12* (2013.01); *B60W 40/10* (2013.01);
(Continued)

(58) Field of Classification Search
CPC ...... B60W 50/14; B60W 30/12; B60W 40/10; B60W 2520/06; B60W 2540/18;
(Continued)

(56) References Cited

U.S. PATENT DOCUMENTS

| 5,483,453 A | 1/1996 | Uemura et al. |
| 2013/0238192 A1 | 9/2013 | Breu |
| 2013/0274985 A1* | 10/2013 | Lee ..................... B62D 15/025 701/23 |

FOREIGN PATENT DOCUMENTS

| EP | 2248710 | 11/2010 |
| EP | 2960131 | 12/2015 |

(Continued)

OTHER PUBLICATIONS

Extended Search Report for European Patent Application No. 22165335.5, dated Oct. 7, 2022, 9 pages.

*Primary Examiner* — Michael V Kerrigan
(74) *Attorney, Agent, or Firm* — Sheridan Ross P.C.

(57) ABSTRACT

The disclosure relates to a lane departure warning method and a lane departure warning system. The lane departure warning method of the disclosure includes: a warning area calculation step in which a warning area for lane departure of a vehicle is calculated based on information about the vehicle and information around the vehicle; a decision making step in which a current position of the vehicle is compared with the warning area calculated in the warning area calculation step, to determine whether the vehicle is located in the warning area and output a decision instruction; and a warning step in which a warning action is performed based on the decision instruction. According to the disclosure, a lane departure status of the vehicle can be more accurately estimated and timely warning can be performed when there is a tendency for lane departure.

11 Claims, 6 Drawing Sheets (52) U.S. Cl.
CPC ..... *B60W 2520/06* (2013.01); *B60W 2540/18* (2013.01); *B60W 2552/30* (2020.02); *B60W 2552/53* (2020.02)

(58) Field of Classification Search
CPC ......... B60W 2552/30; B60W 2552/53; B60W 50/06; B60W 2520/12; B60W 2520/125; B60W 60/0054; B60W 2050/143; B60W 2552/15
See application file for complete search history.

(56) References Cited

FOREIGN PATENT DOCUMENTS

| | | |
|---|---|---|
| JP | 2006-331304 | 12/2006 |
| JP | 2010-009361 | 1/2010 |

\* cited by examiner

LANE DEPARTURE WARNING METHOD AND LANE DEPARTURE WARNING SYSTEM

CROSS-REFERENCE TO RELATED APPLICATION

This application claims the benefit of China Patent Application No. 202110641729.7 filed Jun. 9, 2021, the entire contents of which are incorporated herein by reference in its entirety.

TECHNICAL FIELD

The disclosure relates to vehicle control technologies, and in particular, to a lane departure warning method and a lane departure warning system applied to fully autonomous driving.

BACKGROUND ART

A lane departure warning technology for autonomous driving is critical to ensure autonomous driving. Most of current lane departure warning technologies of autonomous driving lie in lane departure warning (LDW) and lane keeping assist (LKA), which provide transverse control or warning only when a vehicle has departed from a lane. In the lane departure warning (LDW), warning is performed when a current camera detects that a vehicle is about to depart from a lane line. In the lane keeping assist (LKA), information is sent to a control center when a current camera detects that a vehicle is about to depart from a lane line, and then the control center sends an instruction for timely correction of a traveling direction. An existing technology also provides transverse control over a vehicle, and its main manner is that, in most cases, in the case of lane departure during lane keeping support (LKS), the LKS is exited.

The prior art cannot provide, based on a lane departure degree or risk, a warning prompt that is more applicable to a scene and an emergency degree and that is associated with operations of a driver.

SUMMARY OF THE DISCLOSURE

In view of the foregoing problem, the disclosure is intended to provide a lane departure warning method and a lane departure warning system, which can estimate a lane departure status of a vehicle and perform timely warning.

An aspect of the disclosure provides a lane departure warning method, including:
  a warning area calculation step in which a warning area for lane departure of a vehicle is calculated based on information about the vehicle and information around the vehicle;
  a decision making step in which a current position of the vehicle is compared with the warning area calculated in the warning area calculation step, to determine whether the vehicle is located in the warning area and output a decision instruction; and
  a warning step in which a warning action is performed based on the decision instruction.

Optionally, the warning area calculation step includes:
  a departure value calculation substep in which a departure value of a lane line is calculated based on the information about the vehicle and the information around the vehicle; and
  a warning area modification substep in which the original lane line is modified based on the departure value of the lane line calculated in the departure value calculation substep, to obtain a modified lane line, and an area defined by the modified lane line is used as the warning area for lane departure of the vehicle.

Optionally, in the departure value calculation substep, the departure value of the lane line is calculated based on any one of the following, or the departure value of the lane line is a sum of any two or more of the following:
  a departure value of the lane line that is calculated based on a lane width;
  a departure value of the lane line that is calculated based on a lane curvature;
  a departure value of the lane line that is calculated based on a transverse acceleration of the vehicle;
  a departure value of the lane line that is calculated based on a transverse velocity of the vehicle relative to a lane;
  a departure value of the lane line that is calculated based on operations of a driver on a torque; and
  a departure value of the lane line that is calculated based on a staying time of the vehicle.

Optionally, in the departure value calculation substep,
  the departure value of the lane line that is calculated based on the lane width means that a corresponding departure value of the lane line that is obtained based on a current lane width from a preset correspondence between a lane width and a departure value of the lane line is used as the departure value of the lane line based on the correspondence,
  the departure value of the lane line that is calculated based on the lane curvature means that a specified distance of moving the original lane line outward or inward relative to the center of the lane is calculated as the departure value of the lane line based on a value of a road curvature,
  the departure value of the lane line that is calculated based on the transverse acceleration of the vehicle means that when an actual transverse acceleration of the vehicle is less than an expected transverse acceleration for passing through a curve, a specified distance of moving the original lane line on an outer side of the curve inward is calculated as the departure value of the lane line, with a departure value of the original lane line on an inner side of the curve being 0, or a specified distance of moving the original lane line on the inner side of the curve inward is calculated as the departure value of the lane line; or when the actual transverse acceleration of the vehicle is greater than the expected transverse acceleration for passing through the curve, a specified distance of moving the original lane line on the inner side of the curve outward is calculated as the departure value of the lane line, with a departure value of the original lane line on the outer side of the curve being 0, or a specified distance of moving the original lane line on the outer side of the curve outward is calculated as the departure value of the lane line,
  the departure value of the lane line that is calculated based on the transverse velocity of the vehicle relative to the lane means that when a vehicle head faces a right side of the lane, a specified distance of moving the original lane line on the right side inward or a specified distance of moving the original lane line on a left side outward is calculated as the departure value of the lane line; or when the vehicle head faces the left side of the lane, a specified distance of moving the original lane line on the left side inward or a specified distance of moving the original lane line on the right side outward is calculated as the departure value of the lane line, the departure value of the lane line that is calculated based on the operations of the driver on the torque means that when the driver increases a rightward torque on a steering wheel, the specified distance of moving the original lane line on the left side outward is calculated as the departure value of the lane line; or when the driver increases a leftward torque on the steering wheel, the specified distance of moving the original lane line on the right side outward is calculated as the departure value of the lane line, and the departure value of the lane line that is calculated based on the staying time of the vehicle means that when the staying time of the vehicle is greater than a preset threshold and there is no further tendency for outward departure, a specified distance of moving the original lane line on a vehicle stop side outward is calculated as the departure value of the lane line.

Optionally, in the decision making step, whether the driver exerts a torque greater than a specified threshold on the steering wheel is determined, if it is determined that the driver exerts the torque greater than the specified threshold on the steering wheel, autonomous driving navigation is exited, and if it is determined that the driver does not exert the torque greater than the specified threshold on the steering wheel, whether lane departure of the vehicle occurs is determined based on the modified lane line.

Optionally, in the decision making step, a decision instruction for performing warning at different intensities is output based on the departure value of the lane line.

An aspect of the disclosure provides a lane departure warning system, including:
  a warning area calculation apparatus configured to calculate a warning area for lane departure of a vehicle based on information about the vehicle and information around the vehicle;
  a decision making apparatus configured to compare a current position of the vehicle with the warning area calculated by the warning area calculation apparatus, to determine whether the vehicle is located in the warning area and output a decision instruction; and
  a warning apparatus configured to perform a warning action based on the decision instruction.

Optionally, the warning area calculation apparatus includes:
  a departure value calculation submodule configured to calculate a departure value of a lane line based on the information about the vehicle and the information around the vehicle; and
  a warning area modification submodule configured to: modify the original lane line based on the departure value of the lane line calculated by the departure value calculation submodule, to obtain a modified lane line, and use, as the warning area for lane departure of the vehicle, an area defined by the modified lane line.

Optionally, the departure value calculation submodule includes any one or more of the following departure value calculation modules:
  a first departure value calculation module configured to calculate a departure value of the lane line based on a lane width;
  a second departure value calculation module configured to calculate a departure value of the lane line based on a lane curvature;
  a third departure value calculation module configured to calculate a departure value of the lane line based on a transverse acceleration of the vehicle;
  a fourth departure value calculation module configured to calculate a departure value of the lane line based on a transverse velocity of the vehicle relative to a lane;
  a fifth departure value calculation module configured to calculate a departure value of the lane line based on operations of a driver on a torque; and
  a sixth departure value calculation module configured to calculate a departure value of the lane line based on a staying time of the vehicle.

Optionally, the first departure value calculation module uses, as the departure value of the lane line based on a preset correspondence between a lane width and a departure value of the lane line, a corresponding departure value of the lane line that is obtained based on a current lane width from the correspondence, the second departure value calculation module calculates, as the departure value of the lane line based on a value of a road curvature, a specified distance of moving the original lane line outward or inward relative to the center of the lane, when an actual transverse acceleration of the vehicle is less than an expected transverse acceleration for passing through a curve, the third departure value calculation module calculates a specified distance of moving the original lane line on an outer side of the curve inward as the departure value of the lane line, with a departure value of the original lane line on an inner side of the curve being 0, or calculates a specified distance of moving the original lane line on the inner side of the curve inward as the departure value of the lane line; or when the actual transverse acceleration of the vehicle is greater than the expected transverse acceleration for passing through the curve, the third departure value calculation module calculates a specified distance of moving the original lane line on the inner side of the curve outward as the departure value of the lane line, with a departure value of the original lane line on the outer side of the curve being 0, or calculates a specified distance of moving the original lane line on the outer side of the curve outward as the departure value of the lane line, when a vehicle head faces a right side of the lane, the fourth departure value calculation module calculates a specified distance of moving the original lane line on the right side inward or a specified distance of moving the original lane line on a left side outward as the departure value of the lane line; or when the vehicle head faces the left side of the lane, the fourth departure value calculation module calculates a specified distance of moving the original lane line on the left side inward or a specified distance of moving the original lane line on the right side outward as the departure value of the lane line, when the driver increases a rightward torque on a steering wheel, the fifth departure value calculation module calculates the specified distance of moving the original lane line on the left side outward as the departure value of the lane line; or when the driver increases a leftward torque on the steering wheel, the fifth departure value calculation module calculates the specified distance of moving the original lane line on the right side outward as the departure value of the lane line, and when the staying time of the vehicle is greater than a preset threshold and there is no further tendency for outward departure, the sixth departure value calculation module calculates a specified distance of moving the original lane line on a vehicle stop side outward as the departure value of the lane line.

Optionally, the decision making apparatus determines whether the driver exerts a torque greater than a specified threshold on the steering wheel, if it is determined that the driver exerts the torque greater than the specified threshold on the steering wheel, exits autonomous driving navigation, and if it is determined that the driver does not exert the torque greater than the specified threshold on the steering wheel, determines, based on the modified lane line, whether lane departure of the vehicle occurs.

Optionally, the decision making apparatus outputs, based on the departure value of the lane line, a decision instruction for performing warning at different intensities.

An aspect of the disclosure provides a vehicle, including the foregoing lane departure warning system.

An aspect of the disclosure provides a computer-readable medium having a computer program stored thereon, where the computer program implements, when executed by a processor, the foregoing lane departure warning method.

An aspect of the disclosure provides a computer device, which includes a storage module, a processor, and a computer program stored on the storage module and executable on the processor, where when executing the computer program, the processor implements the foregoing lane departure warning method.

DETAILED DESCRIPTION OF EMBODIMENTS

Some of the embodiments of the disclosure are described below and are intended to provide a basic understanding of the disclosure. They are not intended to confirm key or decisive elements of the disclosure or limit the scope of protection.

For concise and illustrative purposes, this specification mainly describes the principles of the disclosure with reference to its exemplary embodiments. However, those skilled in the art will readily recognize that the same principles can be equivalently applied to all types of lane departure warning methods and lane departure warning systems, and the same principles can be implemented therein. Any such changes do not depart from the true spirit and scope of this patent application.

In addition, in the following description, reference is made to the accompanying drawings, which illustrate specific exemplary embodiments. Electrical, mechanical, logical, and structural changes can be made to these embodiments without departing from the spirit and scope of the disclosure. Furthermore, although the features of the disclosure are disclosed in combination with only one of several implementations/embodiments, if any given or recognizable function may be desired and/or advantageous, this feature can be combined with one or more other features of other implementations/embodiments. Therefore, the following description should not be considered in a limiting sense, and the scope of the disclosure is defined by the appended claims and their equivalents.

The terms such as "have" and "include" indicate that in addition to the units (modules) and steps that are directly and clearly described in the specification and the claims, other units (modules) and steps that are not directly or clearly described are not excluded in the technical solutions of the disclosure.

The disclosure relates to a lane departure warning method and a lane departure warning system, and in particular, to transverse control of autonomous driving. The main technical idea includes: firstly calculating a warning area for lane departure of a vehicle in real time based on information about the vehicle and information about an environment around the vehicle, for example, obtaining a lane line (that is, an original lane line) from sensors of the vehicle, calculating a departure value of the lane line, modifying the lane line based on the departure value of the lane line to obtain a modified lane line, and using, as the warning area for lane departure of the vehicle, an area defined by the modified lane line; and then comparing a current position of the vehicle with the warning area of the vehicle to learn whether the vehicle enters the warning area for lane departure of the vehicle, and if it is learned that the vehicle enters the warning area for lane departure of the vehicle, giving a warning to prompt a driver.

Before the lane departure warning method and the lane departure warning system of the disclosure are described, an ADAS of the vehicle is briefly described first.

The advanced driving assistance system (ADAS) uses a variety of sensors (such as a millimeter-wave radar, a laser radar, a monocular/binocular camera, and satellite navigation) mounted on an automobile to sense the surrounding environment at any time during traveling of the automobile, collect data, identify, monitor, and track a still/moving object, and perform system operations and analysis in combination with navigation map data, allowing for a driver to be aware of potential dangers in advance, thereby effectively improving the comfort and safety of the automobile during traveling.

Figure 1:
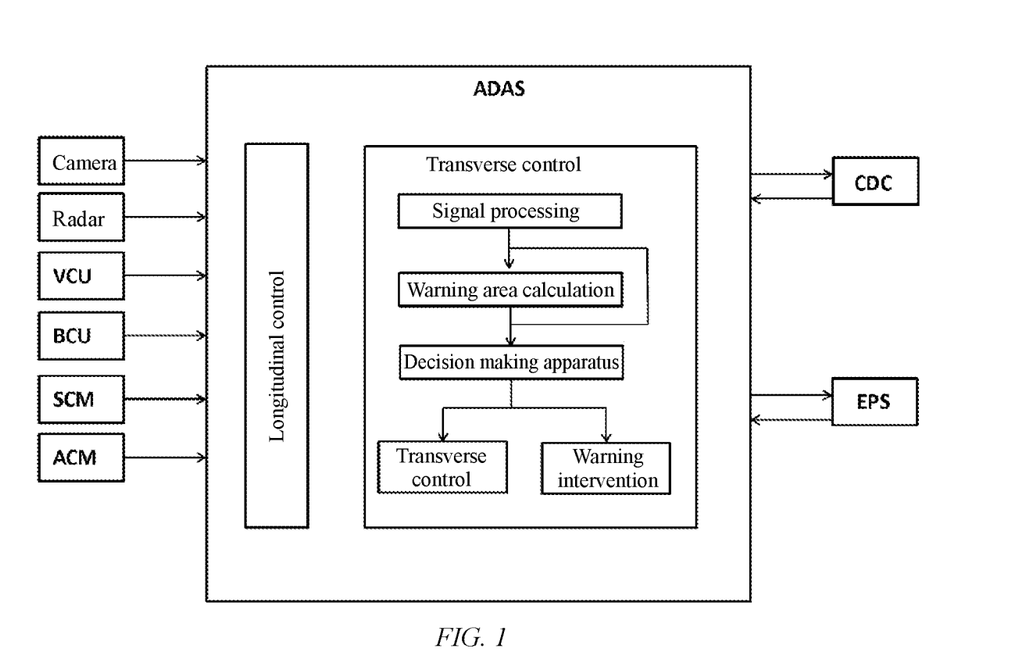
FIG. 1 is a schematic structural diagram of an example of an ADAS to which a lane departure warning system according to the disclosure is applied.

FIG. 1 is a schematic structural diagram of an example of an ADAS to which a lane departure warning system according to the disclosure is applied.

As shown in FIG. 1, a control system of the ADAS is connected to a camera, radar, a vehicular communication unit (VCU), a battery control unit (BCU), a steering control module (SCM), an auxiliary control module (ACM), a continuous damping control (CDC) system, an electric power steering (EPS) system, and other sensors, actuators, or controllers through a CAN bus, for information exchange.

The ADAS obtains information about a road, a road sign, and other vehicles by using the camera, the radar, and other sensors, and obtains information about a vehicle such as a speed, an acceleration, a gear, steering, a transverse control moment of a driver, a selected mode, and a fault by using the VCU, the BCU, the SCM, the ACM, the EPS, and the CDC. The ADAS allows a driver to always know a working status of the vehicle and conducts information exchange with the vehicle by using information such as a warning of the CDC, a current activation mode, and a lane. When a transverse control system of the vehicle is started, the ADAS outputs a target turning angle or target steering torque request to the EPS in real time to control steering of the vehicle, and replaces the driver to control the steering.

The ADAS includes two critical control systems: a longitudinal control system and a transverse control system. Only lane departure warning in transverse control is involved in the disclosure. As shown by the box "Transverse control" in FIG. 1, after signal processing (for example, filtering, validity determination, and fault diagnosis) is performed on an input signal, a warning area for lane departure is calculated based on the processed input signal and output to a decision making apparatus, and the decision making apparatus makes a decision, for example, a decision for transverse control or a decision for warning intervention.

The following describes the lane departure warning method of the disclosure.

Figure 2:
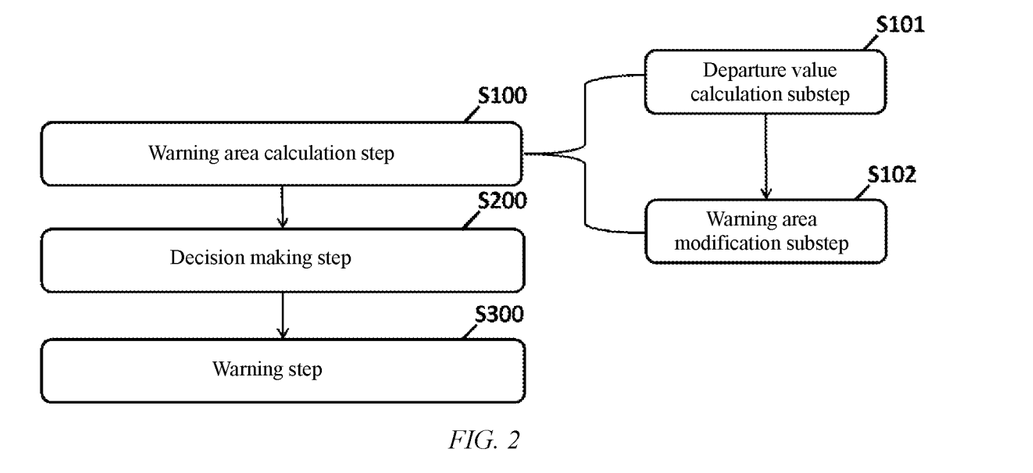
FIG. 2 is a schematic flowchart of a lane departure warning method according to an implementation of the disclosure.

FIG. 2 is a schematic flowchart of a lane departure warning method according to an implementation of the disclosure.

As shown in FIG. 2, the lane departure warning method of the disclosure mainly includes the following steps:

a warning area calculation step S100: a warning area for lane departure of a vehicle is calculated based on information about the vehicle and information around the vehicle;

a decision making step S200: a current position of the vehicle is compared with the warning area calculated in the warning area calculation step S100, to determine whether the vehicle is located in the warning area and output a decision instruction; and a warning step S300: a warning action is performed based on the decision instruction.

The warning area calculation step S100 may further include:

a departure value calculation substep S101: a departure value of a lane line is calculated based on the information about the vehicle and the information around the vehicle; and a warning area modification substep S102: the original lane line is modified based on the departure value of the lane line calculated in the departure value calculation substep S101, to obtain a modified lane line, and an area defined by the modified lane line is used as the warning area for lane departure of the vehicle.

Then, specific content of how to obtain a departure value of a lane line in the departure value calculation substep S101 is described.

In the disclosure, the departure value of the lane line is obtained to modify the original lane line and obtain a modified lane line, the warning area for lane departure is defined by the modified lane line (that is, going beyond the modified lane line means that the vehicle enters the warning area for lane departure), and lane departure is subsequently determined based on the warning area for lane departure.

Figure 3:
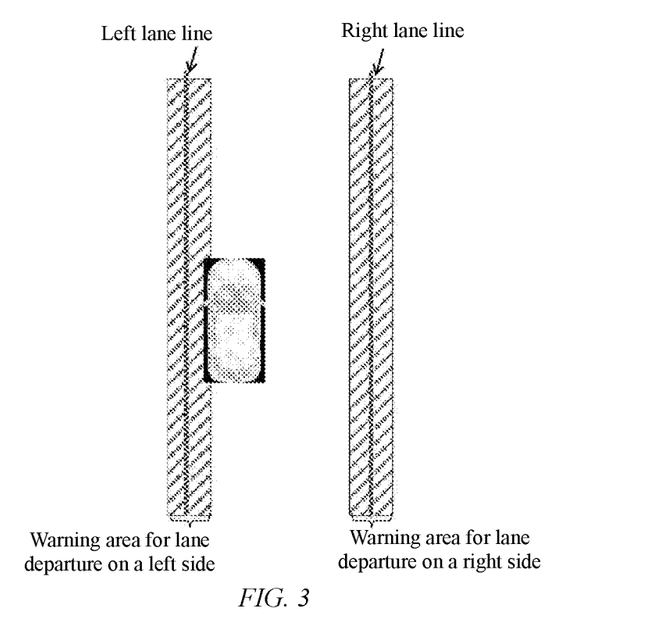
FIG. 3 is a schematic diagram of calculation of a warning area for lane departure in a lane departure warning method according to the disclosure.

FIG. 3 is a schematic diagram of calculation of a warning area for lane departure in a lane departure warning method according to the disclosure. As shown in FIG. 3, a straight line on the left side represents an original left lane line, and a shadow area around the straight line represents a warning area for lane departure on the left side. Likewise, a straight line on the right side represents an original right lane line, and a shadow area around the straight line represents a warning area for lane departure on the right side. The "warning area for lane departure" is defined by the modified lane line that is obtained by modifying the original left/right lane line based on the departure value of the lane line.

In the disclosure, the warning area for lane departure on the left side and the warning area for lane departure on the right side are calculated in the same calculation method. The following gives a description by using the warning area for lane departure on the left side as an example. The calculation method for the right side is the same, and description is omitted herein.

In the lane departure warning method and the lane departure warning system of the disclosure, the warning area for lane departure is estimated in real time based on one or more of the following: a transverse acceleration of a vehicle, a current lane width, a road curvature, a transverse velocity relative to a lane, a torque exerted by a driver on a steering wheel, and the like.

Specifically, in the lane departure warning method and the lane departure warning system of the disclosure, preferably, the warning area $D_{leftWarnZn}$ for lane departure on the left side may, for example, be calculated according to the following formula (1):

$$D_{leftWarnZn}=D_{wL}+D_{Curv}+D_{LatA}+D_{RelLatSpd}+D_{Ovrd}+D_{Sojurn} \quad \text{formula (1)}.$$

Herein, $D_{wL}$ is a departure value of the lane line that is calculated based on a lane width;

$D_{Curv}$ is a departure value of the lane line that is calculated based on a lane curvature;

$D_{LatA}$ is a departure value of the lane line that is calculated based on a transverse acceleration of the vehicle;

$D_{RelLatSpd}$ is a departure value of the lane line that is calculated based on a transverse velocity of the vehicle relative to a lane;

$D_{Ovrd}$ is a departure value of the lane line that is calculated based on operations of a driver on a steering wheel (torque); and $D_{Sojurn}$ is a departure value of the lane line that is calculated based on a staying time of the vehicle.

As shown in formula (1), when the lane width increases, the warning area is appropriately shifted to the inner side of the road, such that the vehicle does not frequently perform warning in a narrow road and can perform timely warning in a wide road (corresponding to $D_{wL}$). When the transverse acceleration of the vehicle toward the outer side of the lane increases, the vehicle is more likely to depart from the lane. The warning area is moved to the inner side of the road, so that early warning is performed, and the driver has more time to take over. For a curved lane, whether the warning area is moved inward to the center of the lane is determined based on a curvature of the outer side of a curve (the side away from a center of the curve) (corresponding to $D_{Curv}$); and whether the warning area is moved outward is determined based on the transverse velocity of the vehicle relative to the lane, so that false warning is prevented (corresponding to $D_{RelLatSpd}$).

In another aspect, six parameters are used when the warning area $D_{leftWarnZn}$ for lane departure on the left side is calculated according to the foregoing formula. This is merely a preferred implementation. In actual applications, any one or more of the six parameters can be selected for calculation, which shall fall within the protection scope of the disclosure. The warning area for lane departure on the right side and the warning area for lane departure on the left side are calculated in the same calculation method. Description is omitted herein.

Then, calculations of the departure values in six scenarios represented by the six parameters are described in detail.

Figure 4:
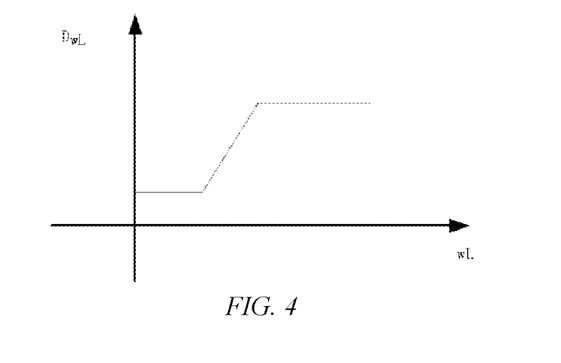
FIG. 4 is a lane width graph showing a correspondence between $D_{wL}$ and a lane width wL.

(1) $D_{wL}$ $D_{wL}$ is a departure value of the lane line that is calculated based on a lane width. FIG. 4 is a lane width graph showing a correspondence between $D_{wL}$ and a lane width wL. $D_{wL}$ is obtained based on the lane width graph shown in FIG. 4. The lane width graph may be preset, or may be updated and adjusted in real time according to an actual situation. As shown in FIG. 4, the transverse axis represents the lane width wL, and the longitudinal axis represents $D_{wL}$. When the lane width wL increases, $D_{wL}$ increases. Then, the warning area is appropriately shifted to the inner side of the lane, such that the vehicle can also perform timely warning in a wide road and does not frequently perform warning in a narrow road. Herein, the lane width is calculated based on information about the left lane line and the right lane line that is input by a visual system.

Figure 5:
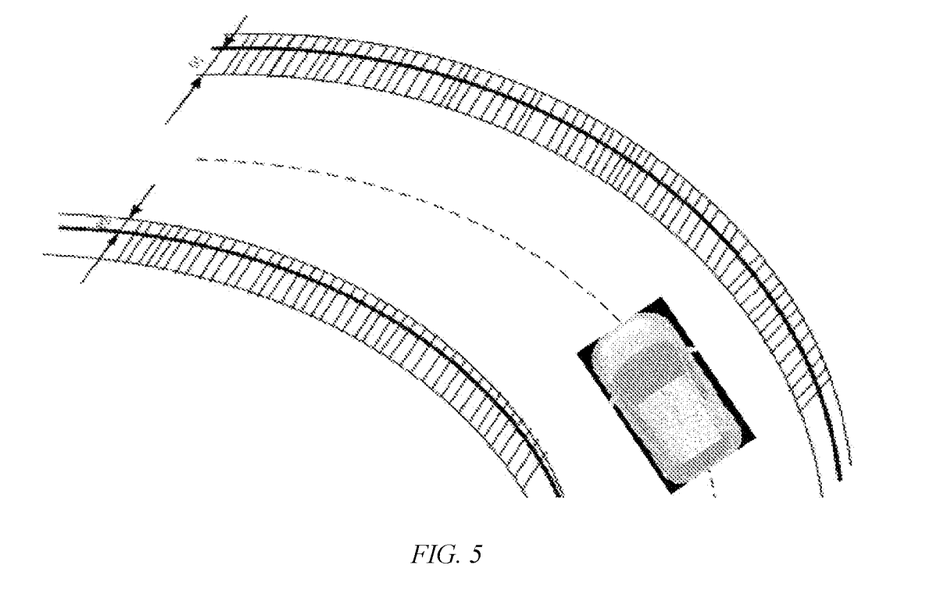
FIG. 5 is a schematic diagram showing a relationship between $D_{Curv}$ and a road curvature.

(2) $D_{Curv}$ $D_{Curv}$ is a departure value of the lane line that is calculated based on a lane curvature. FIG. 5 is a schematic diagram showing a relationship between $D_{Curv}$ and a road curvature. $D_{Curv}$ means that whether the warning area is moved outward or inward relative to the center of the lane is calculated based on a value of the road curvature. In an example of a leftward curve, as shown in FIG. 5, the warning area on the right side of D1 is moved toward the center of the lane (moved inward) by a specific distance, and the warning area on the left side of D2 in FIG. 5 is moved to the outer side of the center of the lane (moved outward) by a specific distance. The road curvature is from the visual system of the vehicle. In the design of the disclosure, the warning area is moved closer to the curve center when the curvature increases, such that warning can be performed earlier.

(3) $D_{LatA}$ $D_{LatA}$ is a departure value of the lane line that is calculated based on a transverse acceleration of the vehicle. Herein, the warning area is calculated based on the transverse acceleration (the transverse acceleration is from an air-bag control module (ACM)) by using the example of the leftward curve. Still referring to the example of the leftward curve in FIG. 5, if there is a deviation between the actual transverse acceleration of the vehicle and an expected transverse acceleration for passing the curve, the warning area is modified based on the deviation value. If the current transverse acceleration (absolute value) of the vehicle is less than an acceleration for normal traveling in a curve, this means that the vehicle is more likely to depart from the center of the lane. In this case, the area D1 needs to be expanded and the area D2 needs to be narrowed or kept unchanged in FIG. 5. If the current transverse acceleration (absolute value) of the vehicle is greater than an acceleration for normal traveling in a curve, this means that the vehicle is more likely to depart to the left side of the lane. In this case, the area D2 needs to be expanded and the area D1 needs to be narrowed or kept unchanged in FIG. 5.

The foregoing content can be understood as: The departure value of the lane line that is calculated based on the transverse acceleration of the vehicle means that if an actual transverse acceleration of the vehicle is less than an expected transverse acceleration for passing a curve, the lane line on the outer side of the curve is moved inward, and the lane line on the inner side of the curve is unchanged or moved inward; or if the actual transverse acceleration of the vehicle is greater than the expected transverse acceleration for passing the curve, the lane line on the inner side of the curve is moved outward, and the lane line on the outer side of the curve is unchanged or moved outward.

Figure 6:
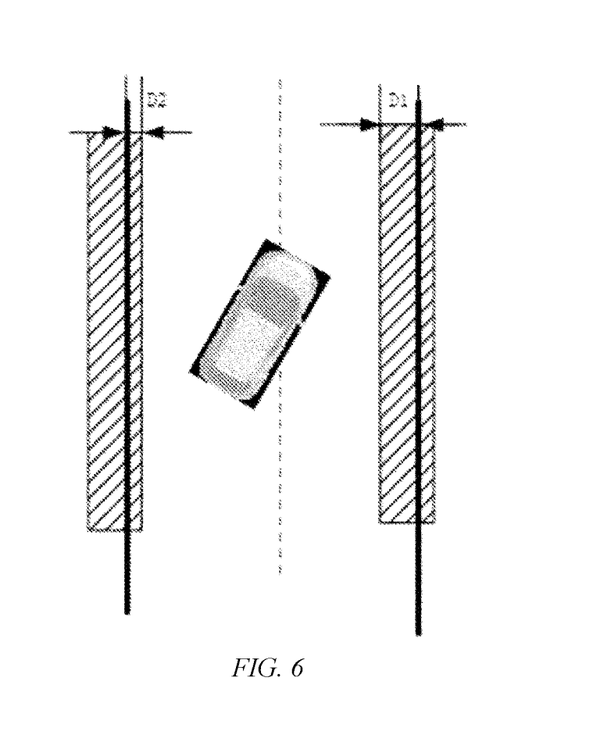
FIG. 6 is a schematic diagram showing a relationship between $D_{RelLatSpd}$ and a transverse velocity of a vehicle.

(4) $D_{RelLatSpd}$ $D_{RelLatSpd}$ is a departure value of the lane line that is calculated based on a transverse velocity of the vehicle relative to a lane. FIG. 6 is a schematic diagram showing a relationship between $D_{RelLatSpd}$ and a transverse velocity of a vehicle. As shown in FIG. 6, in a current state, the vehicle with its head facing rightward is more likely to depart from a lane to the right side. Therefore, a distance of moving a warning area on the right side to the inner side of the lane is calculated based on a value of the transverse velocity as shown in D1 in FIG. 6, so that warning is performed earlier, and a driver has sufficient time to take over. However, the vehicle is less likely to depart from the lane to the left side. Therefore, a warning area on the left side is moved outward, so that false warning is reduced.

The foregoing content can be understood as: The departure value of the lane line that is calculated based on the transverse velocity of the vehicle relative to the lane means that if the vehicle head faces the right side of the lane, the lane line on the right side is moved inward by a specified distance, and the lane line on the left side is moved outward by a specified distance; or if the vehicle head faces the left side of the lane, the lane line on the left side is moved inward by a specified distance and the lane line on the right side is moved outward by a specified distance.

Figure 7:
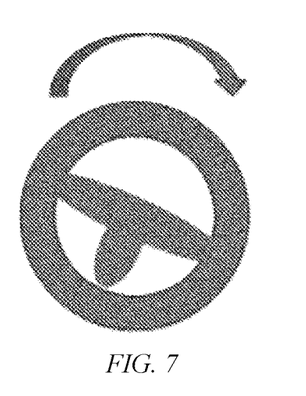
FIG. 7 is a schematic diagram showing a relationship between $D_{Ovrd}$ and operations of a driver on a torque.

(5) $D_{Ovrd}$ $D_{Ovrd}$ is a departure value of the lane line that is calculated based on operations of a driver on a steering wheel (torque). FIG. 7 is a schematic diagram showing a relationship between $D_{Ovrd}$ and operations of a driver on a torque. $D_{Ovrd}$ means that a warning area is modified based on the operations of the driver on the steering wheel (that are determined by using a steering wheel torque signal provided by the EPS) to obtain a departure value of a lane line so as to modify the lane line.

As shown in FIG. 7, if the driver actively exerts a specific torque on the steering wheel and causes a vehicle to depart from a lane, the departure value of the lane line is adjusted based on a value of the torque exerted by the driver on the steering wheel. If the input of the driver causes the vehicle to drive toward the center of the lane, the value of the input of the driver on the steering wheel is determined, and the warning area on the side from which the vehicle is getting away is narrowed. As shown in FIG. 7, because a rightward torque is increased on the steering wheel, the warning area on the left side is narrowed.

The foregoing content can be understood as: The departure value of the lane line that is calculated based on the operations of the driver on the steering wheel (torque) means that if the driver increases the rightward torque on the steering wheel, the lane line on the left side is moved outward by a specified distance; or if the driver increases a leftward torque on the steering wheel, the lane line on the right side is moved outward by a specified distance.

(6) $D_{Sojurn}$ $D_{Sojurn}$ is a departure value of the lane line that is calculated based on a staying time of the vehicle.

Figure 8:
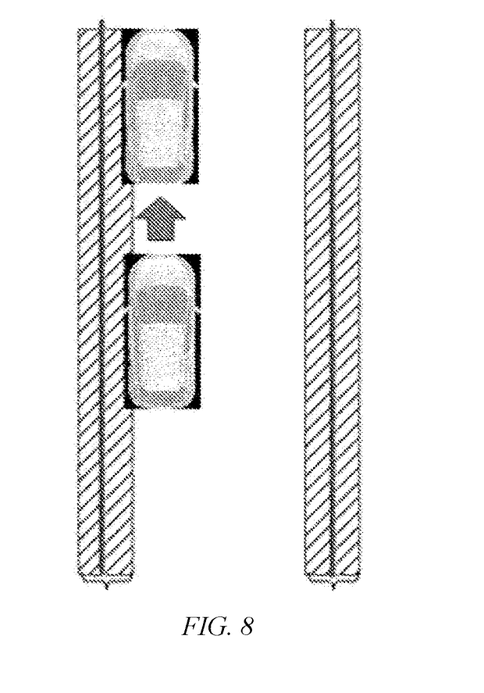
FIG. 8 is a schematic diagram showing a relationship between $D_{Sojurn}$ and a staying time of a vehicle.

FIG. 8 is a schematic diagram showing a relationship between $D_{Sojurn}$ and a staying time of a vehicle. As shown in FIG. 8, if the vehicle stays on one side for a long time and up to a specific time, and there is no further tendency for outward departure, the area is moved outward and the warning area is narrowed.

The foregoing content can be understood as: The departure value of the lane line that is calculated based on the staying time of the vehicle means that if the staying time of the vehicle is greater than a preset threshold and there is no further tendency for outward departure, the lane line on the vehicle stop side is moved outward by a specified distance.

The foregoing describes specific content of calculating the warning area for lane departure according to formula (1). The departure value of the lane line can be calculated to modify the original lane line to obtain a calculation result of the warning area for lane departure. After that, whether the vehicle enters the warning area can be learned by comparing a current position of the vehicle with the warning area for lane departure.

Figure 9:
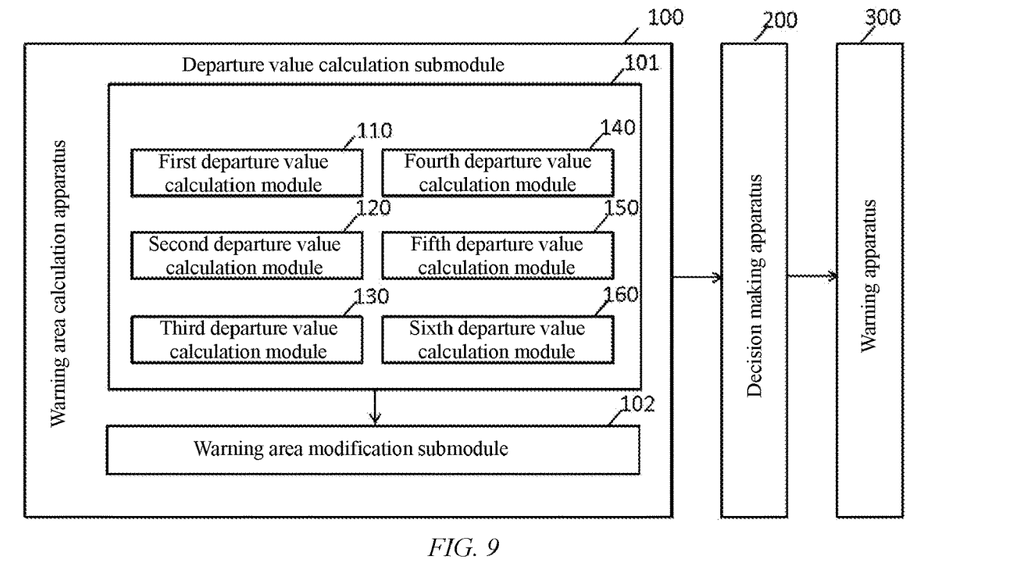
FIG. 9 is a structural block diagram of a lane departure warning system according to an implementation of the disclosure.

FIG. 9 is a structural block diagram of a lane departure warning system according to an implementation of the disclosure.

As shown in FIG. 9, the lane departure warning system according to an implementation of the disclosure includes:
a warning area calculation apparatus 100 configured to calculate a warning area for lane departure of a vehicle based on information about the vehicle and information around the vehicle;
a decision making apparatus 200 configured to compare a current position of the vehicle with the warning area calculated by the warning area calculation apparatus 100, to determine whether the vehicle is located in the warning area and output a decision instruction; and
a warning apparatus 300 configured to perform a warning action based on the decision instruction.

The warning area calculation apparatus 100 includes:
a departure value calculation submodule 101 configured to calculate a departure value of a lane line based on the information about the vehicle and the information around the vehicle; and
a warning area modification submodule 102 configured to: modify the original lane line based on the departure value of the lane line calculated by the departure value calculation submodule 101, to obtain a modified lane line, and use, as the warning area for lane departure of the vehicle, an area defined by the modified lane line.

In a preferred example, the departure value calculation submodule 101 includes any one or more of a first departure value calculation module 110 to a sixth departure value calculation module 160 in the following:
the first departure value calculation module 110 configured to calculate a departure value of the lane line based on a lane width;
the second departure value calculation module 120 configured to calculate a departure value of the lane line based on a lane curvature;
the third departure value calculation module 130 configured to calculate a departure value of the lane line based on a transverse acceleration of the vehicle;
the fourth departure value calculation module 140 configured to calculate a departure value of the lane line based on a transverse velocity of the vehicle relative to a lane;
the fifth departure value calculation module 150 configured to calculate a departure value of the lane line based on operations of a driver on a torque; and the sixth departure value calculation module 160 configured to calculate a departure value of the lane line based on a staying time of the vehicle.

The following describes specific functions of the first departure value calculation module 110 to the sixth departure value calculation module 160.

The first departure value calculation module 110 uses, as the departure value of the lane line based on a preset correspondence between a lane width and a departure value of the lane line, a corresponding departure value of the lane line that is obtained based on a current lane width from the correspondence.

The second departure value calculation module 120 calculates, as the departure value of the lane line based on a value of a road curvature, a specified distance of moving the original lane line outward or inward relative to the center of the lane.

When an actual transverse acceleration of the vehicle is less than an expected transverse acceleration for passing through a curve, the third departure value calculation module 130 calculates a specified distance of moving the original lane line on an outer side of the curve inward as the departure value of the lane line, with a departure value of the original lane line on an inner side of the curve being 0, or calculates a specified distance of moving the original lane line on the inner side of the curve inward as the departure value of the lane line; or when the actual transverse acceleration of the vehicle is greater than the expected transverse acceleration for passing through the curve, the third departure value calculation module calculates a specified distance of moving the original lane line on the inner side of the curve outward as the departure value of the lane line, with a departure value of the original lane line on the outer side of the curve being 0, or calculates a specified distance of moving the original lane line on the outer side of the curve outward as the departure value of the lane line.

When a vehicle head faces a right side of the lane, the fourth departure value calculation module 140 calculates a specified distance of moving the original lane line on the right side inward or a specified distance of moving the original lane line on a left side outward as the departure value of the lane line; or when the vehicle head faces the left side of the lane, the fourth departure value calculation module calculates a specified distance of moving the original lane line on the left side inward or a specified distance of moving the original lane line on the right side outward as the departure value of the lane line.

When the driver increases a rightward torque on a steering wheel, the fifth departure value calculation module 150 calculates the specified distance of moving the original lane line on the left side outward as the departure value of the lane line; or when the driver increases a leftward torque on the steering wheel, the fifth departure value calculation module calculates the specified distance of moving the original lane line on the right side outward as the departure value of the lane line.

When the staying time of the vehicle is greater than a preset threshold and there is no further tendency for outward departure, the sixth departure value calculation module 160 calculates a specified distance of moving the original lane line on a vehicle stop side outward as the departure value of the lane line.

Figure 10:
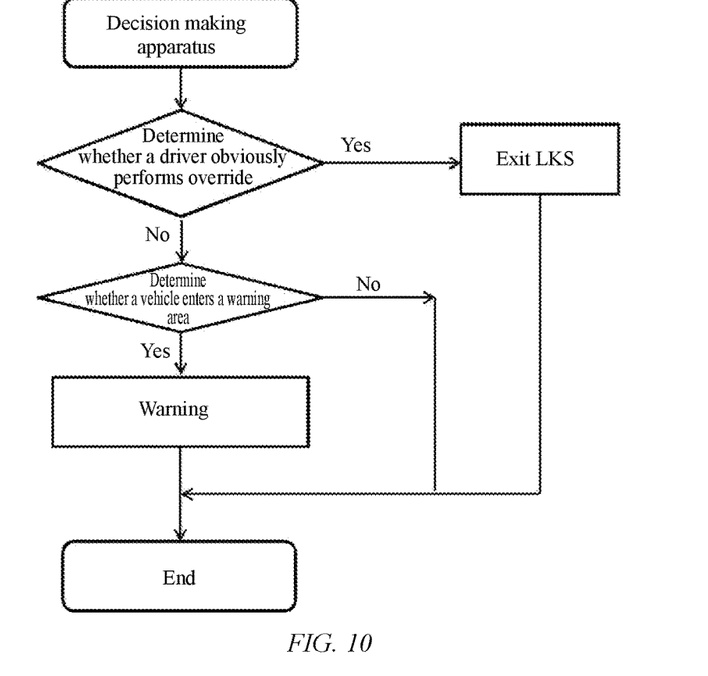
FIG. 10 is a schematic flowchart showing decision making and determination of an alternative implementation of a decision making apparatus.

In an alternative implementation, the decision making apparatus 200 can further determine operations of the driver on the steering wheel. FIG. 10 is a schematic flowchart showing decision making and determination of an alternative implementation of a decision making apparatus.

As shown in FIG. 10, the decision making apparatus determines a torque exertion status of a driver on a steering wheel, and specifically determines whether the driver obviously performs override (for example, exerting a torque greater than a specified threshold). When the decision making apparatus determines a degree at which the driver obviously performs override on the steering wheel and determines that the driver has an obvious intention to control the steering wheel, a decision making result for exiting an LKS is sent to exit transverse control and allow the driver to take over transverse control. When determining that the driver does not obviously perform override on the steering wheel, the decision making apparatus further determines whether the vehicle enters the warning area for lane departure (that is, determining, based on the modified lane line, whether the vehicle departs from the lane). If the vehicle enters the warning area for lane departure, a warning prompt is sent while transverse control is kept, otherwise processing ends.

Figure 11:
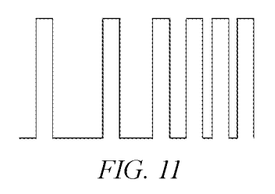
FIG. 11 is a schematic diagram of an example showing warning sound frequency changes of a warning module.

The warning apparatus 300 is configured to perform a warning action based on the decision making result output by the decision making apparatus. For example, the warning module is configured to output response sound or light to warn the driver that the vehicle is about to depart from the lane. Further, if the vehicle still departs from the center of the lane after the prompt, when the vehicle increasingly departs from the lane, the warning sound is sent at an increasingly higher frequency to prompt the driver more obviously as shown in FIG. 11. FIG. 11 is a schematic diagram of an example showing warning sound frequency changes of a warning module. FIG. 11 shows that the frequency of the warning sound of the warning module is increased as the vehicle increasingly departs from the lane.

Further, in an alternative implementation, if the decision making apparatus 200 determines that the vehicle still departs from the lane after the warning is performed by the first warning method such as sound and light, the decision making apparatus 200 further sends a decision instruction and causes the warning apparatus 300 to add a second warning method such as vibration of the steering wheel and vibration of a seat for a more obvious prompt. If the decision making apparatus 200 determines that the vehicle still departs from the lane under the action of these warning methods, when the middle line of the vehicle goes beyond the original lane line, the decision making apparatus 200 sends a decision instruction to exit transverse control.

According to the lane departure warning method and the lane departure warning system of the disclosure, the departure value of the original lane line is calculated to modify the original lane line and obtain a modified lane line, and the modified lane line is used to determine whether the vehicle departs from the lane, so that lane departure of the vehicle can be more accurately estimated and timely warning can be performed when there is a tendency for lane departure.

The disclosure further provides a vehicle, including the foregoing lane departure warning system.

The disclosure further provides a computer-readable medium having a computer program stored thereon, where the computer program implements, when executed by a processor, the foregoing lane departure warning method.

The disclosure further provides a computer device, which includes a storage module, a processor, and a computer program stored on the storage module and executable on the processor, where when executing the computer program, the processor implements the foregoing lane departure warning method.

The foregoing examples mainly describe the lane departure warning method and the lane departure warning system of the disclosure. Although only some specific implementations of the disclosure are described, those of ordinary skill in the art should understand that the disclosure may be implemented in many other forms without departing from the essence and scope of the disclosure. Accordingly, the presented examples and implementations are considered to be illustrative rather than restrictive, and the disclosure may encompass various modifications and replacements without departing from the spirit and scope of the disclosure that are defined by the appended claims.

The invention claimed is:

1. A lane departure warning method, comprising:
a warning area calculation step in which a warning area for lane departure of a vehicle is calculated based on information about the vehicle and information around the vehicle;
a decision making step in which a current position of the vehicle is compared with the warning area calculated in the warning area calculation step, to determine whether the vehicle is located in the warning area and output a decision instruction; and
a warning step in which a warning action is performed based on the decision instruction,
wherein the warning area calculation step comprises:
a departure value calculation substep in which a departure value of an original lane line is calculated based on the information about the vehicle and the information around the vehicle; and
a warning area modification substep in which the original lane line is modified based on the departure value of the original lane line calculated in the departure value calculation substep, to obtain modified lane lines, wherein an area defined by the modified lane lines are used as the warning area for lane departure of the vehicle.

2. The lane departure warning method according to claim 1, wherein
in the departure value calculation substep, the departure value of the original lane line is calculated based on any one of the following, or the departure value of the original lane line is a sum of any two or more of the following:
a departure value of the original lane line that is calculated based on a lane width;
a departure value of the original lane line that is calculated based on a lane curvature;
a departure value of the original lane line that is calculated based on a transverse acceleration of the vehicle;
a departure value of the original lane line that is calculated based on a transverse velocity of the vehicle relative to a lane;
a departure value of the original lane line that is calculated based on operations of a driver on a torque; and
a departure value of the original lane line that is calculated based on a time the vehicle stays toward one side of the lane.

3. The lane departure warning method according to claim 2, wherein
in the departure value calculation substep,
the departure value of the original lane line that is calculated based on the lane width means that the departure value of the original lane line is obtained based on a current lane width by using a preset correspondence between lane widths and departure values of lane line, the departure value of the lane line that is calculated based on the lane curvature means that a specified distance of moving the original lane line outward or inward relative to a center of the lane is calculated as the departure value of the lane line based on a value of a road curvature, the departure value of the lane line that is calculated based on the transverse acceleration of the vehicle means that when an actual transverse acceleration of the vehicle is less than an expected transverse acceleration for passing through a curve, a specified distance of moving the original lane line on an outer side of the curve inward is calculated as the departure value of the lane line, with a departure value of the original lane line on an inner side of the curve being 0, or a specified distance of moving the original lane line on the inner side of the curve outward is calculated as the departure value of the lane line; or when the actual transverse acceleration of the vehicle is greater than the expected transverse acceleration for passing through the curve, a specified distance of moving the original lane line on the inner side of the curve outward is calculated as the departure value of the lane line, with a departure value of the original lane line on the outer side of the curve being 0, or a specified distance of moving the original lane line on the outer side of the curve outward is calculated as the departure value of the lane line, the departure value of the lane line that is calculated based on the transverse velocity of the vehicle relative to the lane means that when a vehicle head faces a right side of the lane, a specified distance of moving the original lane line on the right side inward and a specified distance of moving the original lane line on a left side outward is calculated as the departure value of the lane line; or when the vehicle head faces the left side of the lane, a specified distance of moving the original lane line on the left side inward and a specified distance of moving the original lane line on the right side outward is calculated as the departure value of the lane line, the departure value of the lane line that is calculated based on the operations of the driver on the torque means that when the driver increases a rightward torque on a steering wheel, the specified distance of moving the original lane line on the left side outward is calculated as the departure value of the lane line; or when the driver increases a leftward torque on the steering wheel, the specified distance of moving the original lane line on the right side outward is calculated as the departure value of the lane line, and the departure value of the lane line that is calculated based on the staying time of the vehicle means that when the staying time of the vehicle is greater than a preset threshold and there is no further tendency for outward departure, a specified distance of moving the original lane line on a vehicle stop side outward is calculated as the departure value of the lane line.

4. The lane departure warning method according to claim 3, wherein in the decision making step, whether the driver exerts a torque greater than a specified threshold on the steering wheel is determined, if it is determined that the driver exerts the torque greater than the specified threshold on the steering wheel, autonomous driving navigation is exited, and if it is determined that the driver does not exert the torque greater than the specified threshold on the steering wheel, whether lane departure of the vehicle occurs is determined based on the modified lane lines.

5. The lane departure warning method according to claim 1, wherein in the decision making step, a decision instruction for performing warning at different intensities is output based on the departure value of the lane line.

6. A lane departure warning system, comprising:

a warning area calculation apparatus configured to calculate a warning area for lane departure of a vehicle based on information about the vehicle and information around the vehicle;

a decision making apparatus configured to compare a current position of the vehicle with the warning area calculated by the warning area calculation apparatus, to determine whether the vehicle is located in the warning area and output a decision instruction; and a warning apparatus configured to perform a warning action based on the decision instruction, wherein the warning area calculation apparatus comprises:

a departure value calculation submodule configured to calculate a departure value of an original lane line based on the information about the vehicle and the information around the vehicle; and a warning area modification submodule configured to: modify the original lane line based on the departure value of the original lane line calculated by the departure value calculation submodule to obtain modified lane lines, and use, as the warning area for lane departure of the vehicle, an area defined by the modified lane lines.

7. The lane departure warning system according to claim 6, wherein the departure value calculation submodule comprises any one or more of the following departure value calculation modules:

a first departure value calculation module configured to calculate a departure value of the original lane line based on a lane width;

a second departure value calculation module configured to calculate a departure value of the original lane line based on a lane curvature;

a third departure value calculation module configured to calculate a departure value of the original lane line based on a transverse acceleration of the vehicle;

a fourth departure value calculation module configured to calculate a departure value of the original lane line based on a transverse velocity of the vehicle relative to a lane;

a fifth departure value calculation module configured to calculate a departure value of the original lane line based on operations of a driver on a torque; and a sixth departure value calculation module configured to calculate a departure value of the original lane line based on a time the vehicle stays toward one side of the lane.

8. The lane departure warning system according to claim 7, wherein the first departure value calculation module obtains the departure value of the original lane line based on a current lane width by using a preset correspondence between lane widths and departure values of lane line, the second departure value calculation module calculates, as the departure value of the lane line based on a value of a road curvature, a specified distance of moving the original lane line outward or inward relative to a center of the lane, when an actual transverse acceleration of the vehicle is less than an expected transverse acceleration for passing through a curve, the third departure value calculation module calculates a specified distance of moving the original lane line on an outer side of the curve inward as the departure value of the lane line, with a departure value of the original lane line on an inner side of the curve being 0, or calculates a specified distance of moving the original lane line on the inner side of the curve outward as the departure value of the lane line; or when the actual transverse acceleration of the vehicle is greater than the expected transverse acceleration for passing through the curve, the third departure value calculation module calculates a specified distance of moving the original lane line on the inner side of the curve outward as the departure value of the lane line, with a departure value of the original lane line on the outer side of the curve being 0, or calculates a specified distance of moving the original lane line on the outer side of the curve outward as the departure value of the lane line, when a vehicle head faces a right side of the lane, the fourth departure value calculation module calculates a specified distance of moving the original lane line on the right side inward and a specified distance of moving the original lane line on a left side outward as the departure value of the lane line; or when the vehicle head faces the left side of the lane, the fourth departure value calculation module calculates a specified distance of moving the original lane line on the left side inward and a specified distance of moving the original lane line on the right side outward as the departure value of the lane line, when the driver increases a rightward torque on a steering wheel, the fifth departure value calculation module calculates the specified distance of moving the original lane line on the left side outward as the departure value of the lane line; or when the driver increases a leftward torque on the steering wheel, the fifth departure value calculation module calculates the specified distance of moving the original lane line on the right side outward as the departure value of the lane line, and when the staying time of the vehicle is greater than a preset threshold and there is no further tendency for outward departure, the sixth departure value calculation module calculates a specified distance of moving the original lane line on a vehicle stop side outward as the departure value of the lane line.

9. The lane departure warning system according to claim 8, wherein the decision making apparatus determines whether the driver exerts a torque greater than a specified threshold on the steering wheel, if it is determined that the driver exerts the torque greater than the specified threshold on the steering wheel, exits autonomous driving navigation, and if it is determined that the driver does not exert the torque greater than the specified threshold on the steering wheel, determines, based on the modified lane lines, whether lane departure of the vehicle occurs.

10. The lane departure warning system according to claim 6, wherein the decision making apparatus outputs, based on the departure value of the lane line, a decision instruction for performing warning at different intensities.

11. A computer device, comprising a storage module, a processor, and a computer program stored on the storage module and executable on the processor, wherein when executing the computer program, the processor implements a lane departure warning method, and the method comprises:

a warning area calculation step in which a warning area for lane departure of a vehicle is calculated based on information about the vehicle and information around the vehicle;

a decision making step in which a current position of the vehicle is compared with the warning area calculated in the warning area calculation step, to determine whether the vehicle is located in the warning area and output a decision instruction; and a warning step in which a warning action is performed based on the decision instruction, wherein the warning area calculation step comprises:

a departure value calculation substep in which a departure value of an original lane line is calculated based on the information about the vehicle and the information around the vehicle; and a warning area modification substep including: modifying the original lane line based on the departure value of the original lane line calculated in the departure value calculation substep to obtain modified lane lines, and using an area defined by the modified lane lines as the warning area for lane departure of the vehicle.

\* \* \* \* \*